INVENTOR
Robert W. Davidson
BY Wentworth B. Clapham
ATTORNEY

April 4, 1967 R. W. DAVIDSON 3,312,181
CARGO RESTRAINING METHODS AND DEVICES
Filed March 2, 1964 3 Sheets-Sheet 3

*INVENTOR*
Robert W. Davidson

BY Wentworth B. Clapham
*ATTORNEY*

United States Patent Office 3,312,181
Patented Apr. 4, 1967

3,312,181
CARGO RESTRAINING METHODS AND DEVICES
Robert W. Davidson, Stamford, Conn., assignor to American Machine & Foundry Company, a corporation of New Jersey
Filed Mar. 2, 1964, Ser. No. 348,434
5 Claims. (Cl. 105—369)

This invention relates to cargo restraint in vehicles, being particularly useful in connection with the handling of cargoes in high speed jet aircraft. The invention is primarily concerned with providing a method and means whereby cargoes can be restrained in such fashion as to achieve a preferred or advantageous distribution of the forces occurring when the cargo is subjected to a maximum contemplated inertial force such as that which would occur when an aircraft encounters unusual air turbulence or is subjected to an imperfect landing, or when a truck or railway car is subjected to an unusually abrupt stop. Though not limited thereto, the invention finds particular use in cargo handling systems of the type described in my copending applications Ser. No. 261,930, filed Feb. 11, 1963, and Ser. No. 296,177, filed July 19, 1963.

In modern cargo vehicles, and particularly aircraft, economy requires maximum utilization of the space within the vehicle for cargo, and minimizing of the space taken up by elements of the cargo handling system. Thus, it is common practice to employ palletized or containerized cargo units which are positioned in close proximity to each other within the vehicle so that only a minimum number of attachment points are available in the vehicle for installation of cargo restraining elements. Accordingly, there is a need for special control and distribution of cargo restraining forces in order that the limited number of attachment points can best be utilized.

In numerous applications, particularly in aircraft, further problems arise because of the strength variations characteristic of the vehicle itself. Thus, for example, it may not be desirable to concentrate the restraining device attachment fittings along the longitudinal central portion of the floor of a cargo airplane since the structure may afford greater support at points spaced somewhat transversely away from the central portion thereof. In air cargo systems employing pallets, a somewhat similar difficulty is encountered because it is desirable to have the pallet extend as near wall-to-wall as possible, so as to achieve maximum use of the space for cargo, with the result that there is little or no room left for tie-down fittings at the sides of the pallet.

A general object of the invention is to provide a method and means whereby the forces applied by the cargo to elements which restrain the same against undue movement can be so distributed as to make possible the most effective use of a limited number of restraining element attachment points, even though those points may be restricted to particular positions in the vehicle, which positions may not be best suited for full cargo restraint.

Another object is to devise a cargo restraining method and system which makes practical the use of thin, light weight pallets not capable of withstanding the loads applied to the restraining means in the event of subjection of the cargo to a predetermined maximum inertial force.

A further object is to achieve maximum use of the volumetric space in a vehicle for payload, with only a minimum space required for cargo restraining means.

Stated generally, these and other objects are achieved by employing cargo restraining means including both primary or main cargo restraining elements and supplemental elements, both of which can be in the form of straps or tapes, for example, the main restraining elements having a predetermined high spring rate so as to be capable of acting in combination to assume the majority of the forces applied by the cargo, the supplemental elements having a predetermined lower spring rate such that these elements act to contain the cargo during normal movement of the vehicle, the main and supplemental elements being so arranged that the ends of the main elements can be attached to the available tie-down points in the vehicle. Typically, the invention can employ a thin, light pallet adapted to be engaged by fore and aft lock-down devices in an aircraft, the main restraining elements then being attached to the lock-down devices and running longitudinally of the aircraft, the supplemental units running transversely of the aircraft and being attached to the sides of the pallet so as to require no direct attachment to the aircraft, the difference in spring rates being so selected that the majority of the forces applied by the cargo is assumed by the main restraining elements and thus applied to the aircraft structure rather than to the pallet.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
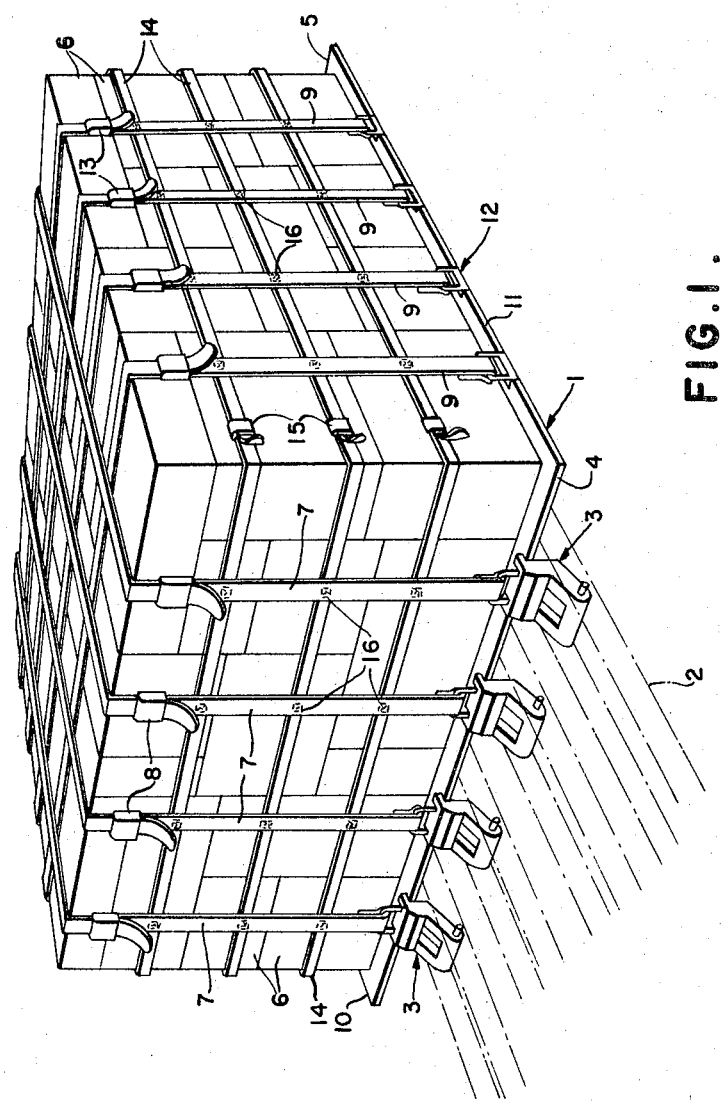
FIGURE 1 is a perspective view of a palletized cargo unit in accordance with one embodiment of the invention.

FIGURE 1 illustrates a typical palletized cargo unit in accordance with the invention. A thin, light weight, rectangular pallet 1 is employed. Typically, the pallet can be of heavy duty plywood or other equivalent construction. In the embodiment illustrated, the pallet is supported by a plurality of elongated roller conveyor trays shown in phantom lines at 2 and constructed in accordance with the aforementioned copending application Ser. No. 296,177, the roller conveyor trays being mounted on the floor of the aircraft or other cargo vehicle. Roller conveyor trays 2 are equipped with a plurality of holddown devices indicated generally at 3 and described in detail hereinafter with reference to FIGURE 2. The devices 3 are arranged in fore and aft groups, the devices of the fore group serving to lock down the front edge 4 of the pallet, and the devices of the aft group serving to lock down the rear edge 5 of the pallet.

Pallet 1 supports the cargo, consisting of a plurality of boxes 6 stacked to form a rectangular load. A plurality of main restraining tapes or straps 7 extend between longitudinally aligned pairs of the lock-down devices 3 and over the cargo. Thus, the tapes 7 can be considered as parallel and extending generally longitudinally of the vehicle. Each main restraining tape 7 is equipped with a conventional buckle or other tensioning device 8, so that the tape can be made taut on the cargo.

A plurality of supplemental straps or tapes 9 extend transversely across the load and have their ends attached to the pallet 1 respectively adjacent edges 10 and 11 thereof, such attachment being accomplished by means of suitable hook or ring devices indicated generally at 12 and described in detail hereinafter. Each supplemental tape 9 is equipped with a buckle or other tensioning device 13 so that the tape can be made taut about the cargo. The supplemental tapes 9 can be considered as parallel to each other and extending at right angles across the portions of main restraining tapes 7 at the top of the load, the tapes 9 thus extending transversely of the vehicle.

Additional, smaller tapes 14 extend horizontally about the sides of the cargo, these tapes having buckles 15 adjustably securing their end portions together so that the tapes can be made taut around the cargo. The additional tapes 14 are parallel to each other and cross beneath the vertical portions of all of the straps 7 and 9.

In some cases it is desirable that the tapes 7, 9 and 14 can constitute an integrated cargo net, wherein the tapes are secured together, as by stitching, at the cross-over points 16. Under some conditions, it may not be desirable to connect them. For example, an inner net covering the cargo, which may be rigid and/or non-rigid cargo, is secured to pallet 1, and an outer retaining system comprising tapes or straps 7, 9 and 14 can be used. The nature of the cargo usually determines the type or types of restraining means to be used.

Figure 2:
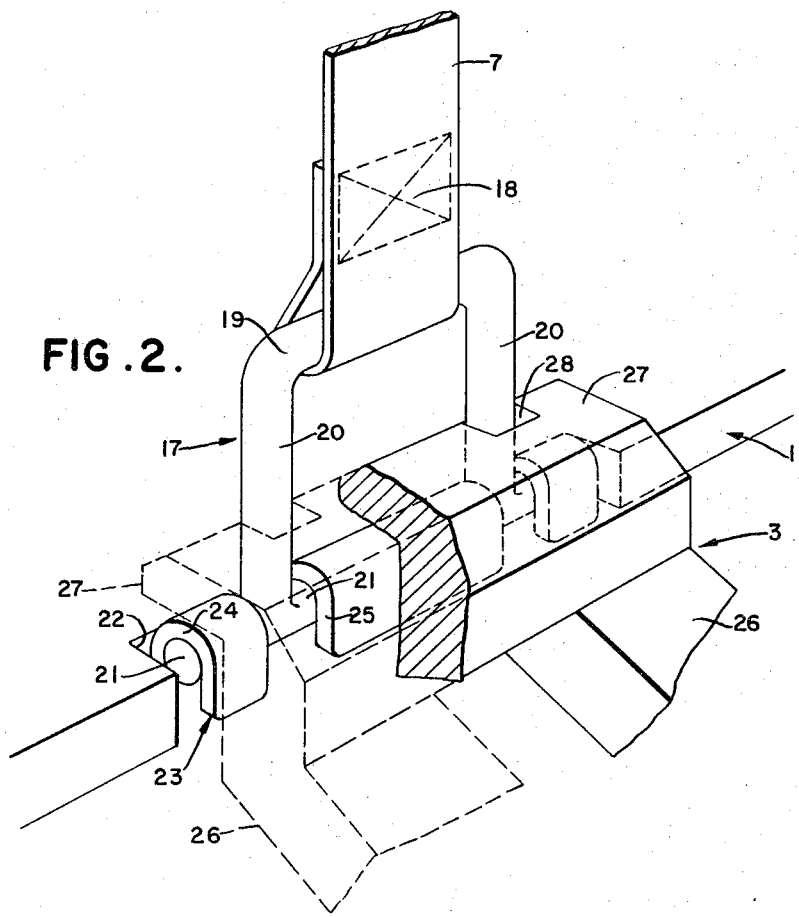
FIGURE 2 is an enlarged perspective view of one of the lock-down devices employed in the embodiment of FIGURE 1 for locking down the pallet and attaching the main restraining elements.

As seen in FIGURE 2, each end of each tape 7 is looped through a hook device indicated generally at 17, the end of the tape then being stitched to the body of the tape at 18. Hook device 17 includes a U-shaped portion comprising base 19 and legs 20, the ends of legs 20 being interconnected by a cross rod 21. The appropriate edge of panel 1, such as edge 4, is provided with a notch 22, the depth of the notch being materially greater than the diameter of cross rod 21. A catch member 23 is fixed to the pallet and has a downwardly opening generally U-shaped portion 24 disposed in notch 22. Portion 24 is provided with two spaced openings 25 to accommodate legs 20. Accordingly, the hook device 17 can be installed with cross rod 21 fully accommodated within portion 24 and legs 20 extending upwardly through openings 25. Accordingly, elements 17 and 23 serve to connect the ends of tapes 7 to the pallet 1 adjacent one of the edges 4 and 5 in such fashion that, when the cargo is assembled on the pallet as seen in FIGURE 1, and the restraining net applied, the resulting unitized load can be rolled along the roller conveyor trays 2 to a position such that edges 4 and 5 of the pallet extend transversely across the trays 2 at the locations for lock-down devices 3.

Referring again to FIGURE 2, each lock-down device 3 includes a pair of arms 26 which are retained by one of the trays 2 and extend upwardly therefrom, terminating in a cross bar 27. Cross bar 27 is dimensioned to project over member 23 and cross rod 21 of hook device 17 and is provided with notches 28 which respectively accommodate the legs 20 of the hook device 17. It being understood that the arms 26 serve to rigidly connect the lock-down device 3 to the corresponding tray 2, and thus to the structure of the aircraft or other vehicle, as described in detail in the aforementioned copending application Ser. No. 296,177, the overall effect of the combination seen in FIGURE 2 is to convey directly to the vehicle structure those loads which are assumed by the main restraining tapes 7.

Figure 3:
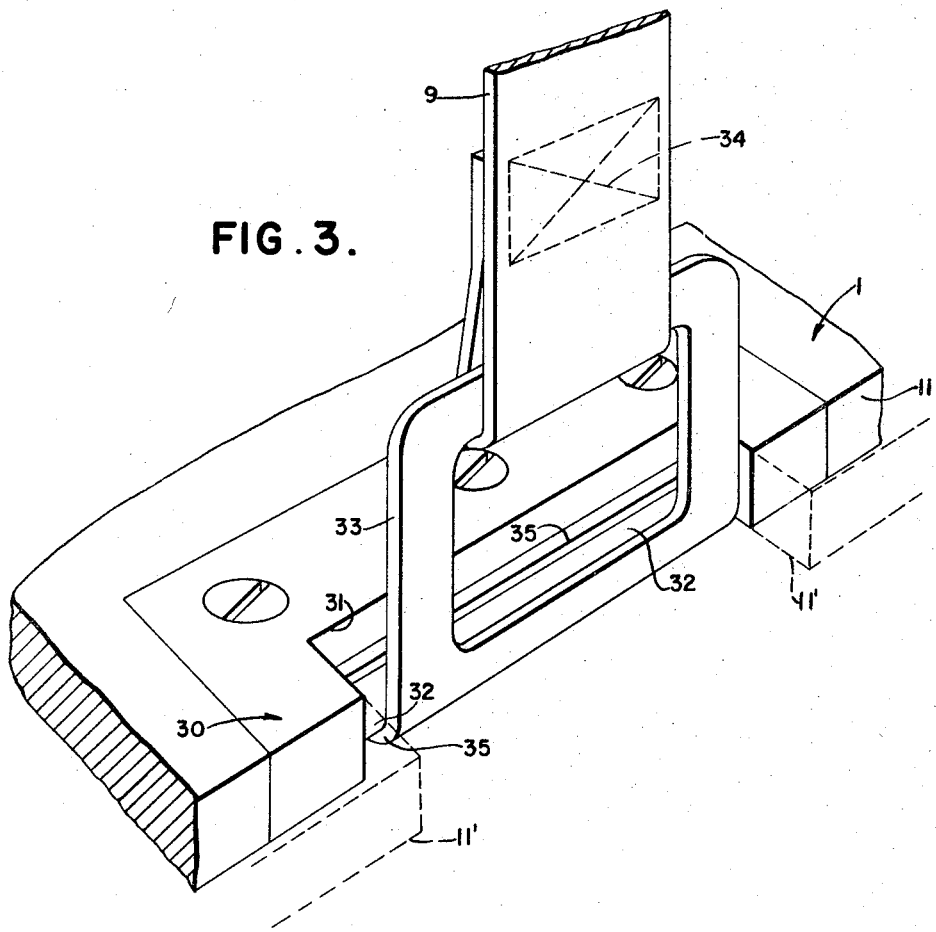
FIGURE 3 is an enlarged perspective view of one of the devices used to secure the ends of the supplemental elements in the embodiment of FIGURE 1.

Along edges 10 and 11, the pallet 1 is provided with notches each accommodating a bracket indicated generally at 30, FIGURE 3. Rigidly fixed to the pallet, each bracket 30 has an outwardly opening notch 31 across which extends a retaining rod 32, rod 32 having its ends fixedly secured to the bracket. Each end of each supplemental tape 9 is looped through the rectangular main body portion 33 of a different one of the hooks 12, the end of the tape being secured to the tape body, as by stitching at 34. The side portion of body 33 opposite the corresponding tape 9 is bent in hooked configuration, as indicated at 35, and is engaged beneath the corresponding retaining rod 32. Accordingly, the structure seen in FIGURE 3 is effective to attach the end of the supplemental tape directly to the appropriate edge of the pallet 1.

The main restraining tapes 7, in this embodiment, are woven of nylon or polyethylene terephthalate fiber (e.g., Dacron) in such fashion as to have a predetermined relatively high spring rate and low elongation under high loads. Other suitable materials having sufficient strength and controlled resiliency can be used. The spring rate of tapes 7 is so chosen that those tapes, acting in conjunction, can assume the major portion of loads which would result when the cargo as a whole is subjected to a certain maximum contemplated inertial force, the tapes 7 then imparting those loads directly to the vehicle structure via lock-down devices 3.

The supplemental tapes 9 can also be woven of nylon or polyethylene terephthalate fiber, but are constructed to have a spring rate which is markedly lower than that of tapes 7. The lower spring rate for suplemental tapes 9 is so chosen that, while these tapes are active to contain the load and provide such a restraining action as is required under normal movements of the vehicle, they do not exert on the pallet 1 loads of the same order of magnitude as those assumed by the main restraining tapes 7. In this connection, it is to be noted that the pallet 1 projects transversely well beyond the outermost roller conveyor trays 2, so that the portions of the pallet adjacent edges 10 and 11 are cantilevered and, in view of the thin, light weight construction of the pallet, relatively weak as compared to the forces occurring when the cargo is subjected to large inertial forces during sudden deceleration of the vehicle. Remembering that the ends of the suplemental straps 9 are attached directly to the pallet, and not to the vehicle structure, it will be seen that, if tapes 9 are allowed to assume anything like the same load forces applied to the main restraining tapes 7, the edge portions of the pallet adjacent edges 10 and 11 will be ruptured.

Advantageously, the spring rate for tapes 9 is predetermined at a value which will allow these tapes to apply to the pallet forces adequate to bend the edge portions of the pallet at edges 10 and 11 slightly upwardly, giving to the pallet a very shallow channel-shaped transverse cross section. This markedly increases the stiffness of the pallet in the longitudinal direction and assures that edges 4 and 5 of the pallet will remain in constant operative engagement with the lock-down devices 3.

From the foregoing, it will be understood that the tapes 7 and 9 combine to form a cargo restraining net in which the tapes 7 are parallel and have a higher spring rate while the tapes 9 extend across tapes 7 and have a lower spring rate. With such a net, the tapes 7 can be made to assume virtually all, or most, or a major proportion of the total maximum load for the greatest inertial force contemplated during carrying of the cargo. The ends of tapes 7 can be attached directly to the structure of the vehicle, while the ends of the lower spring rate tapes 9 can be attached to any suitable points of attachment, such as the pallet in the embodiment illustrated. Use of such a net has the distinct advantage of limiting the number of points of attachment which are required to bear large loads. Obviously, in the embodiment illustrated in FIGURE 1, the pallet 1 can extend virtually completely across the floor of the aircraft or other vehicle, no space being required at the lateral edges 10 and 11 of the pallet for true load-bearing attachment devices. Accordingly, this arrangement makes possible a maximum utilization of the available space within the vehicle for cargo.

Figure 4:
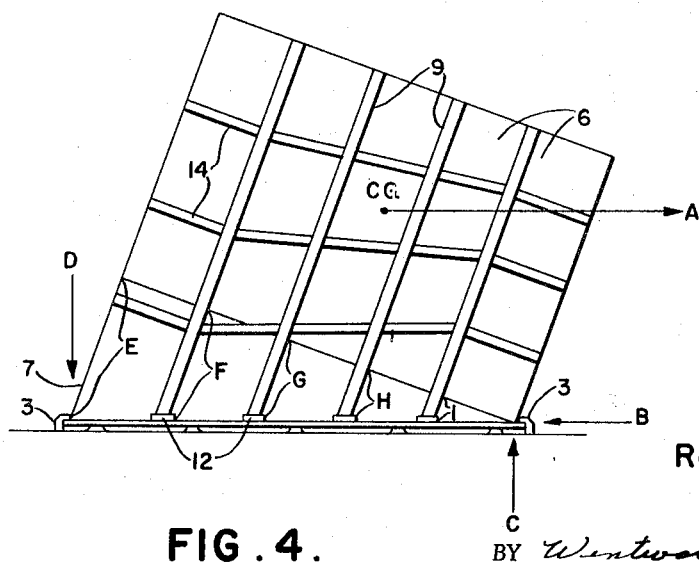
FIGURE 4 is a diagrammatic elevational view of the embodiment of FIGURE 1, showing the elements thereof during application of a large inertial force to the cargo.

Referring now to FIGURE 4, this diagrammatic illustration shows the effect of application of a large inertial force to the cargo 6 in a forward direction, relative to the movement of the vehicle. To simplify this consideration, the pallet 1 is assumed to have an adequate modulus of elasticity and relatively low strength characteristics. The cargo or load, which may be rigid or semi-rigid, is shown in FIG. 4 as being of a rigid nature and is in an attitude resulting when equilibrium has been established, that is, reaction B equals inertial force A, and the couple formed by reactions C and D have overcome the resulting moment. Recognizing that restraining straps 7, supplemental straps 9, pallet 1, lock-down devices 3 and attachments 12 are all assembled as hereinbefore described with reference to FIGURES 1–3, it will be understood that the upward forces resulting from the example illustrated in FIGURE 4 will be transmitted directly to the vehicle via the lock-down devices 3. Since there is no direct attachment between devices 12 and the vehicle structure, all of the forces developed in tapes 9 must be transmitted to the lock-down devices via the pallet, which acts as a cantilever beam. The forces developed in tapes 7 are, of course, transferred directly to lock-down devices 3 and, hence, to the vehicle structure. Under the conditions illustrated in FIGURE 4, the tapes 7 have been elongated by an amount indicated at E and, neglecting friction, this elongation can be assumed to be uniform throughout the length of the tapes 7. The tapes 9, on the other hand, have been elongated by twice the amounts F–I, respectively, since the elongations just indicated appear at both sides of the cargo.

Accordingly, the loads applied at the lock-down devices 3 and at the hooks 12 are functions of the elongation of the particular tapes connected to the lock-down devices and the hooks. Considering for purposes of simplicity that the material of the various tapes has a linear spring characteristic, the loads at the various points mentioned above can be arrived at easily. For purposes of illustration, assume that the distance E is predetermined at 24 inches (for some contemplated inertial force A) and that, unlike the system hereinbefore described with reference to FIGURES 1–3, all of tapes 7 and 9 have the same spring rate of 200 lbs. per inch. The load applied to lock-down devices 3 is then 19,200 lbs., or 4,800 lbs. per lock-down device. The supplemental tape 9 nearest the left end of the cargo, as viewed in FIGURE 4, has been elongated by approximately 40 inches (20 inches per side of the cargo) and a load of 4,000 lbs. is thus indicated at each of the hooks to which this supplemental strap it attached. The loads for the remaining three supplemental straps, reading from left to right as viewed in FIGURE 4, can be similarly arrived at as 3,000, 2,000 and 1,000 lbs., respectively, so that there would be a total load of 10,000 lbs. applied to pallet 1 along edge 10, and an identical load applied to the pallet along edge 11. Such a load would obviously be too high for the cantilevered edge portions of the pallet to withstand. Again for purposes of simplicity of discussion, it can be assumed that this load is twice that which can be assumed by the edge portion of the pallet.

Under these circumstances, overloading of the edge portions of pallet 1 can be avoided by employing for tapes 9 a material such that the tapes have a spring rate of, let us say, 100 lbs. per inch. which is 50 percent of the spring rate initially contemplated for the main restraining tapes 7 in this theoretical example. If the distance E remains the same, the 50 percent reduction in the spring rate for tapes 9 would reduce the load applied to the edge portions at 10 and 11 of the pallet to 5,000 lbs., a value which could be acceptable. However, since the total restraint capability of the net has been reduced, the deflection under inertial force A would increase, so that distance E, as well as distances F–I would increase, so that the reduction in the loads applied to the edge portions of the panel at 10 and 11 would not be as great as desired. Accordingly, the spring rate for straps 7 is increased to an extent such that the deflection through distance E remains at the predetermined 24 inch maximum. Alternatively, the spring rate for tapes 9 could be further reduced. This example illustrates, however, that making tapes 7 of a material presenting a high spring rate, and tapes 9 of a material having a minimized spring rate, allows the loads resulting from the inertial force A to be concentrated mainly at the lock-down devices 3, and thus applied directly to the vehicle structure, while the loads applied to the pallet along edges 10 and 11 via the connections 12 are minimized or held to a relatively low value which can be survived by the pallet. The overall effect of such selection of the relative spring rates for tapes 7 and 9 is accomplishment of a predetermined distribution of the load forces so that the load forces can be applied to those points of attachment on the vehicle which are available for this purpose. The illustrative example in FIGURE 4 has been chosen to match the environmental conditions presented in FIGURE 1, where the load-bearing lock-down devices are arranged fore and aft with respect to the cargo. It should be understood, however, that the invention is useful in accomplishing predetermined distribution of the load forces in other manners than that just described. For example, should the points of attachment in the vehicle which are capable of accepting the high loads contemplated for crash landings, for example, be located at opposite sides of the vehicle, rather than fore and aft, tapes 7, FIGURE 1, can then extend transversely of the vehicle, while the supplemental tapes 9 extend longitudinally thereof. With all of tapes 7, 9 and 14 secured together to form a net assembly, tapes 9 and 14 are then effective to transmit to tapes 7 those forces which occur in fore and aft directions, so that the ultimate load will be assumed at the sides of the cargo, rather than at the front and back thereof.

As indicated earlier in this specification, aircraft structures frequently present adequate strength for maximum load-bearing points of attachment only in specific locations. Referring again to FIGURE 1, it will be noted that there are four main restraining tapes 7, these being equally spaced in a direction transversely of the cargo, and thus transversely of the vehicle, so that the two inboard tapes 7 terminate near the center of the floor of the aircraft, for example, while the two outboard tapes 7 terminate at points nearer the sides of the floor. Under such circumstances, it is desirable to have at least most of the load applied to the outboard points of attachment, and to limit the magnitude of the loads at the two inboard points of attachment. To accomplish this, the two outermost tapes 7 can have a higher spring rate, while the two innermost tapes 7 have a predetermined lower spring rate, the ultimate result being that a larger proportion of the load occurring during a crash landing, for example, will be assumed by the two outboard tapes 7, and a lesser proportion of that load will be assumed by the two inboard tapes 7.

Figure 5:
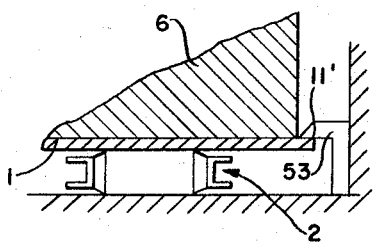
FIGURE 5 is a fragmentary diagrammatic view illustrating another embodiment of the invention.

Though the embodiment of the invention described with reference to FIGURES 1–3 is particularly advantageous because of its simplicity, it should be understood that, depending upon the particular vehicle involved, it may be desirable to pass some of the load directly through the vehicle at the sides of the cargo, rather than only at the fore and aft ends of the cargo. Thus, for example, the pallet 1 can be so constructed that the edge 11' thereof projects laterally beyond the hook device 12, the same change being made at the opposite edge of the pallet. With this modification, it is then possible to have the lateral edges of the pallet engaged beneath hold-down ledges secured to the vehicle, as indicatd at 53, FIGURE 5. The spring rate for the supplemental tapes 9 can then be increased, so that a larger proportion of the total load is applied via these tapes to the edges 10 and 11 of the pallet, this larger proportion of the load being directly imparted to the vehicle structure, as by the ledge at 53, FIGURE 5.

It should also be understood that, while the example illustrated diagrammatically in FIGURE 4 involves an inertial force directed generally longitudinally of the vehicle, the same analysis set out above with reference to FIGURE 4 can be applied to inertial forces acting vertically relative to the vehicle.

While particularly advantageous embodiments of the invention have been illustrated and described, it will be understood by those skilled in the art that various changes and modifications can be made therein without departing from the scope of the invention, as defined in the appended claims.

What is claimed is:

1. In a cargo restraining system for containing a load on a pallet in a vehicle, the combination of
at least two sets of tie-down devices, means securing said devices to said vehicle with said sets spaced form each other a distance adequate to accommodate the cargo;
a plurality of restraining elements each having one end attached to a tie-down device of one of said sets and the other end attached to a tie-down device of the other of said sets,
said restraining elements extending over the cargo and having a predetermined spring rate such as to enable said restraining elements in combination to restrain the cargo against more than a predetermined amount of displacement under a maximum contemplated inertial force; and
a plurality of coacting elongated flexible cargo restraining elements extending over the cargo at an angle to said main restraining elements and having their ends fixed to said pallet,
said coacting restraining elements having a predetermined spring rate less than that of said first-named elements such that, when the cargo is subjected to said maximum contemplated inertial force, said coacting restraining elements apply to said pallet load containing forces which are small as compared to those assumed by said first-named restraining elements and transferred to said tie-down devices.

2. A cargo restraining net comprising
a plurality of elongated flexible restraining elements; and
a plurality of elongated flexible coacting restraining elements having terminal portions adapted to be connected to a pallet,
said first-named restraining elements extending generally parallel to each other,
said coacting restraining elements extending across said first-named restraining elements,
selected ones of said first-named restraining elements having a higher spring rate than the others of said first-named restraining elements,
said coacting restraining elements all having a spring rate substantially lower than that of said selected ones of said first-named restraining elements, said first-named elements having terminal portions adapted to be connected to a pallet and to anchoring devices in a vehicle, and means positioning said first-named restraining elements and said second-named restraining elements in a selected coacting operative arrangement relative to a pallet and to cargo to be contained thereby, such that forces developed in said elements exert a predetermined force pattern on said anchoring devices.

3. In a cargo restraining system for use with a vehicle equipped with a plurality of lock-down devices arranged in two spaced apart series, and
a generally rectangular pallet having two opposite edges spaced apart by a distance such that said edges can each be operatively engaged each with a different set of said lock-down devices;
the improvement comprising a plurality of elongated flexible restraining elements dimensioned to extend over the cargo supported by said pallet,
the ends of said restraining elements being attachable to said lock-down devices,
at least selected ones of said main restraining elements having a predetermined high spring rate such that, acting in combination, said restraining elements will restrain the cargo against more than a predetermined amount of displacement under a maximum contemplated inertial force;
a plurality of coacting elongated flexible restraining elements of such length as to be capable of extending between the other edges of said pallet and over the load; and
means for attaching the opposite ends of each of said coacting restraining elements to said pallet at said other edges thereof,
said coacting restraining elements having a predetermined lower spring rate,
said first-named restraining elements and said coacting restraining elements coacting to contain the cargo during normal movement of the vehicle, and said first-named restraining elements assuming the predominant proportion of the forces resulting from movement of the load under the maximum contemplated inertial force.

4. In a cargo restraining system for use with a vehicle equipped with a plurality of spaced, fore lock-down devices and a plurality of spaced, aft lock-down devices, and
a generally rectangular pallet having two opposite edges spaced apart by a distance such that one of said edges can be engaged with and held by the fore lock-down devices and the other thereof can be engaged with and held by the aft lock-down devices;
the improvement comprising a plurality of elongated, flexible, main restraining elements of such length as to extend over the cargo supported by said pallet,
the ends of said main restraining elements being respectively attachable to said lock-down devices,
at least selected ones of said main restraining elements having a predetermined high spring rate such that, acting in combination, said main restraining elements will restrain the cargo against more than a predetermined amount of displacement under a maximum contemplated inertial force;
a plurality of elongated, flexible, supplemental restraining elements arranged for coaction with said main restraining elements and of such length as to be capable of extending between the other edges of said pallet and over the load; and
means for attaching each end of each of said supplemental restraining elements to said pallet at a different one of said other edges thereof,
said pallet being of such thin and light construction as to be incapable of withstanding forces of the order of magnitude applied to said main restraining elements by the cargo upon occurrence of said maximum contemplated inertial force,
said supplemental elements having a spring rate which is small as compared to that of said main restraining elements.

5. A device for containing a palletized cargo load on a vehicle when the vehicle presents maximum force-bearing tie-down points spaced apart along one axis, comprising a plurality of elongated flexible main restraining elements disposed over a load on a pallet positioned on the floor of said vehicle in such fashion that said elements extend at least generally parallel to said axis with the ends of said main restraining elements in coacting secured relationship with said tie-down points, a plurality of elongated flexible supplemental elements disposed in such fashion over said load as to extend at an angle to said axis, means securing the ends of said supplemental elements to the pallet and in coacting relationship with said main restraining elements, said main restraining elements having a predetermined larger spring rate than said supplemental elements such as to enable said elements to restrain the load against a maximum contemplated inertial force, and said supplemental elements having a predetermined smaller spring rate than said main restraining elements such that, when the load moves through an anticipated displacement resulting from said inertial force, said supplemental elements apply to said pallet load containing forces which are small as compared to the load restraining forces applied by said main restraining elements to said vehicle tie-down points, whereby said main restraining elements and said supplemental elements coact to contain the load on said pallet during movement of the vehicle and the load restraining forces resulting from the maximum contemplated inertial force are assumed by said main restraining elements and transferred thereby to said maximum force-bearing tie-down points.

References Cited by the Examiner

UNITED STATES PATENTS

| | | | |
|---|---|---|---|
| 2,058,716 | 10/1936 | Pagel | 105—369 |
| 2,372,967 | 4/1945 | Martin | 105—369 |
| 2,669,402 | 2/1954 | Del Mar | 105—376 |
| 2,735,377 | 2/1956 | Elsner | 105—369 |
| 2,756,693 | 7/1956 | Frost | 105—369 |
| 2,858,774 | 11/1958 | Batten | 105—366 |
| 3,070,043 | 12/1962 | Decker | 105—369 |
| 3,093,092 | 6/1963 | Martin et al. | 105—369 |
| 3,173,539 | 3/1965 | Looker | 105—369 |
| 3,204,581 | 9/1965 | Davidson | 105—369 |
| 3,210,038 | 10/1965 | Bader et al. | 105—369 |

ARTHUR L. LA POINT, *Primary Examiner.*

DRAYTON E. HOFFMAN, *Examiner.*